Sept. 30, 1958 M. F. DUERKOB 2,854,549
PROTECTORS FOR ELECTRIC CIRCUITS
Filed Nov. 9, 1953 5 Sheets-Sheet 1

INVENTOR
Manfred F. Duerkob

BY Rey Eilers
ATTORNEY

INVENTOR
Manfred F. Duerkob
BY
Rey Eilers
ATTORNEY

Sept. 30, 1958 M. F. DUERKOB 2,854,549
PROTECTORS FOR ELECTRIC CIRCUITS
Filed Nov. 9, 1953 5 Sheets-Sheet 3

INVENTOR
Manfred F. Duerkob
BY
Rey Eilers
ATTORNEY

Sept. 30, 1958  M. F. DUERKOB  2,854,549
PROTECTORS FOR ELECTRIC CIRCUITS
Filed Nov. 9, 1953  5 Sheets-Sheet 4

FIG 16  FIG 17

INVENTOR
Manfred F. Duerkob
BY
Rey Eilers
ATTORNEY

FIG 19   FIG 18

United States Patent Office 2,854,549
Patented Sept. 30, 1958

2,854,549

PROTECTORS FOR ELECTRIC CIRCUITS

Manfred F. Duerkob, St. Louis, Mo., assignor to McGraw-Edison Company, a corporation of Delaware Application November 9, 1953, Serial No. 391,087

14 Claims. (Cl. 200—133)

This invention relates to improvements in protectors for electric circuits. More particularly this invention relates to improvements in holders for cartridge enclosed protectors for electric circuits.

It is therefore an object of the present invention to provide an improved holder for cartridge enclosed protectors for electric circuits.

It is frequently desirable to enclose electrical equipment within a housing or casing or to dispose it behind a protective wall; and where this is done the electrical equipment may be referred to as protected electrical equipment. The protective wall or the housing or casing can protect the electrical equipment against injury from nearby objects, and the housing or casing can also protect the electrical equipment from contact with air borne moisture, grit and other foreign matter. In those cases where cartridge enclosed protectors for electric circuits are used with protected electrical equipment, it is desirable to mount those protectors on the protective wall or on the housing or casing in such a way that those protectors can readily be inspected and replaced. Those protectors for electric circuits are preferably mounted in holders that are themselves mounted in openings in the protective wall or in the casing or housing.

The openings in the protective wall or the casing or housing facilitate the mounting of the holders for the cartridge enclosed protectors for electric circuits, but those openings raise the problem of sealing the mating surfaces of the holders to the protective wall or the casing or housing to prevent the leakage of water, grit and other foreign matter. In some instances it has been suggested that a sheet of rubber or other resilient material be placed adjacent the outer face of the protective wall or of the housing or casing and that a part of the sheet be cut away to accommodate the holder for the protector for electric circuits. Such a sheet of material can work satisfactorily if the pressure between the holder and the protective wall or the casing or housing is not so great that the sheet of resilient material is forced out of position and thereby provides a leakage path. However, the amount of pressure between the holder and the protective wall or the housing or casing can vary with the strength and experience of the installer; and the sheet of resilient material can be forced outwardly from its sealing position and thereby permit a leakage path to be established. This, of course, is objectionable. The present invention obviates this objection, and provides a positive seal between the holder and the protective wall or the housing or casing by providing a shoulder on the holder that has an annular recess of semi-circular cross sections and by mounting an O-ring in that recess. The O-ring will directly engage the portion of the protective wall or the housing or casing that defines the opening for the holder, and thus it can provide full sealing action. The semi-circular cross section of the annular recess is important since it enables the walls of that recess to resist sideways movement of the O-ring when the O-ring is compressed. Consequently, the O-ring is always held in the desired position irrespective of the amount of pressure applied to it. In this way a positive water-tight and air-tight seal can be established and maintained between the holder and the protective wall or the housing or casing of the protected electrical equipment. It is therefore an object of the present invention to provide a holder for protectors for electric circuits which has a shoulder intermediate the ends thereof, which has an annular recess of semi-circular cross section in the shoulder, and which has an O-ring mounted in that recess. The holder, for protectors for electric circuits, that is provided by the present invention has screw threads on the exterior thereof. These threads can receive a nut, and that nut will be tightened on those threads to maintain the holder in position relative to a wall, casing, housing or instrument panel. In most cases the tightening of the nut on the threads will enable the holder to maintain itself in intimate engagement with the wall, casing, housing or panel. In some instances, however, where the wall, casing, housing or panel is subjected to continuous vibration, the nut can tend to work its way along the screw thread until the engagement between the holder and the wall, housing, casing or panel is too loose. This, of course, is objectionable. The present invention obviates any such tendency by providing its combination of threads, nut, semi-circular recess and the O-ring held therein. The O-ring will yield sufficiently to absorb the vibrations which the wall, housing, casing or panel would otherwise transmit to the holder, and will thus preclude accidental loosening of the nut. In this way, any pressure that is initially established by the threads and the nut will be maintained by the conjoint action of the nut, the threads and the O-ring. It is therefore an object of the present invention to provide a holder, for protectors for electric circuits, which has an O-ring held in a semi-circular annular recess, threads on the exterior thereof, and a nut that can be threaded onto those threads.

The holder provided by the present invention has a generally cylindrical configuration. However, one part of the exterior of that holder is flat; and that part enables that holder to resist rotation whenever it is set in a wall, casing, housing or panel which has a generally circular opening with one straight side. In addition, that flat part of the holder enables that holder to be held against rotation in an opening which is circular but which has a notch or recess contiguous with it; a pin being inserted in the notch or recess to engage the flat part of the holder. This flat part is thus desirable since it simplifies the installation of the holder while holding it against undesired rotation. It is therefore an object of the present invention to provide a holder, for protectors for electric circuits, which is generally cylindrical but which has one flat part on the exterior thereof. The holder, for protectors for electric circuits, that is provided by the present invention has two relatively movable parts and has a second O-ring between those two parts. One part of the holder is fixedly secured to the protective wall or the housing or casing of the protected electric equipment, and the other part of the holder is a closure for the first part. An O-ring is carried by the closure, and it provides a tight seal between the two parts of the holder; thus providing an air-tight and water-tight joint in the holder. This second O-ring cooperates with the O-ring in the recess of the shoulder of the holder to maintain the air-tight and water-tight integrity of the protective wall or the housing or casing for the protected electrical equipment. It is therefore an object of the present invention to provide an O-ring which is disposed between and that seals the relatively movable parts of a holder for protectors for electric circuits.

The fixed part of the holder, for protectors for electric circuits, that is provided by the present invention has three contacts in the interior thereof. These contacts have leads extending through openings in the walls of the fixed part of that holder; and those leads substantially fill those openings, thereby making the fixed part of that holder substantially air-tight and water-tight. As a result those leads coact with the closure of the holder and with the O-ring carried by that closure to provide a substantially water-tight and air-tight holder for protectors for electric circuits. Such a holder is very desirable where the protected electrical equipment is used in a damp climate, in a location where corrosive fumes are present, or in locations where the air is filled with finely divided particles of conducting material. It is therefore an object of the present invention to provide a holder, for protectors for electric circuits, that has a plurality of contacts in the interior thereof and which has leads extending through openings in the walls of the fixed part thereof, and that has those leads substantially filling and closing those openings. The closure for the holder, for protectors for electric circuits, provided by the present invention is provided with a light-transmitting portion that encloses a lamp. This lamp can be connected with the protector for electric circuits so it will give a visual indication of the condition of that protector. The light-transmitting portion of the closure must be made of a material that is sturdy, inexpensive and capable of being molded readily. The material that most nearly fits those conditions is polystyrene; but that material is a thermoplastic material and it can thus soften and distort in the presence of heat and pressure. Consequently it is essential to keep the light-transmitting portion of the closure as cool as possible. However, since it is usually necessary to place a resistor in series with the lamp to reduce the voltage drop across that lamp, and since it is customary to place that resistance close to the lamp, the light-transmitting portion of the holder would ordinarily become quite hot. The present invention avoids excessive heating of the light-transmitting portion of the closure, while still keeping the voltage-dropping resistor in series with the lamp, by mounting that resistor on the fixed part of the holder. With this arrangement closure will be on one side of the wall, housing, casing or panel and the resistor will be on the other, and the heat from the resistor will not be able to affect that closure or the light-transmitting portion thereof. It is therefore an object of the present invention to provide a holder with a thermoplastic light-transmitting portion that is disposable on one side of wall, housing, casing or panel, and with a resistor that is disposable on the other side. It is frequently difficult to secure thermoplastic parts to metal because thermoplastic materials tend to be brittle and to crack when cut or drilled. In some instances a press fit between the thermoplastic and metal parts has been sufficient, but such a fit can lose its effectiveness when the thermoplastic part gets warm and begins to soften. In other instances, cement is used to secure the thermoplastic and metal parts together, but cements often lose their ability to hold to metal. For these reasons, prior methods of securing metal and thermoplastic parts together have not been as useful as desired. The present invention overcomes the deficiencies in prior methods of securing thermoplastic and metal parts by applying local heat and pressure to those parts to concomitantly form a recess in the thermoplastic part and a complementary projection on the metal part. This is done by applying a rapidly rotating hardened steel point to the exterior of the metal part until that part softens and also heats the thermoplastic part to its softening temperature. Thereafter the metal and thermoplastic parts can have the requisite projection and recess formed. It is therefore an object of the present invention to apply a rapidly rotating tool to a metal part which is in contact with a thermoplastic part, and to apply sufficient heat and pressure to that tool to form a projection on the metal part and a mating recess in the thermoplastic part. The light-transmitting housing of the holder, for protectors for electric circuits, provided by the present invention has an annular contact and has a tubular contact. The annular contact is connected to one of the leads of the lamp and the tubular contact is connected to the other lead of that lamp. These contacts are directly engageable with, or separable from, a set of contacts on the fixed part of the holder; and the engagement between these sets of contacts is wholly independent of the configuration, shape or cleanliness of the terminals of the protector for electric circuits. This is desirable since an installer with greasy hands might get sufficient grease on the terminals of the protector for electric circuits to interfere with the operation of the lamp if the current flowing to the lamp had to flow through those terminals. It is therefore an object of the present invention to provide a holder, for protectors for electric circuits, wherein an electrical path is provided for the lamp which is wholly independent of the terminals of the protector for electric circuits. The holder, for protectors for electric circuits, provided by the present invention has three terminals at the exterior thereof. In some instances two of those terminals will be connected together to place the lamp and the protector for electric circuits in parallel relation. In other instances the said two terminals can be left independent so that the lamp can be placed in series with the protector for electric circuits. In still other instances, bells and alarms can be connected to one or more of those terminals. The provision of these three terminals at the exterior of the holder thus provides considerable versatility and flexibility in the use of the holder, for protectors for electric circuits, provided by the present invention.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Referring to the drawing in detail, the numeral 20 generally denotes a portion of a protective wall, housing, casing or panel, and this portion 20 has an opening therethrough. A holder, for protectors for electric circuits, has two parts, and one of those parts is denoted by the numeral 22. This part has a small diameter portion 24 of cylindrical configuration and it has a larger diameter portion 26 of cylindrical configuration. A radially extending shoulder is formed between the two cylindrical portions of the part 22 of the holder provided by the present invention.

An axially-directed bore 28 is formed in the part 22, and that bore has a small diameter cylindrical portion, a larger cross section polygonal portion, and then four cylindrical portions of progressively larger diameter. The smallest diameter section of the bore is adjacent the bottom of the part 22 of the holder, as that holder is viewed in Fig. 6, and the largest diameter section of the bore is adjacent the top of that part of the holder, as that holder is viewed in Fig. 6. An opening 30 is formed in the end of the small diameter portion 24 of the part 22, and a generally cylindrical contact 32 is mounted in that opening. The diameter of the contact 32 is closely similar to the diameter of the opening 30 and the contact 32 has a radially extending flange or rim 34 that extends radially outwardly beyond the inner diameter of the opening 30. The contact 32 extends through the wall of the small diameter portion 24 of the part 22 of the holder and it extends through an opening in a plate 36 which abuts the end of the small diameter portion 24. The portion of the contact 32 which extends through the opening in the plate 36 is spun or riveted over to provide an intimate mechanical and electrical engagement between the contact 32 and the plate 36. A mass of solder 38 is flown onto the contact 32 and onto the plate 36 to provide a positive unitary electrical bond for the contact 32 and the plate 36. The plate 36 has an opening 40 at one end thereof and has a securing tab 42 at the other end thereof. The securing tab extends beyond the edge of the small diameter portion 24 and extends into a recess 62 formed in the exterior of that small diameter portion. The spinning or riveting action used to connect the plate 36 with the contact 32 draws the contact 32 into extremely intimate engagement with the end of the small diameter portion 24 of the part 22 of the holder. In addition, the plate 36 overlies any clearance between the outer diameter of the contact 32 and the inner diameter of the opening 30, and in this way the opening 30 is substantially filled and closed. In this way, the end of the small diameter portion 24 of the part 22 of the holder is made substantially water-tight and air-tight.

The numeral 44 denotes an opening in the wall of the small diameter portion 24 of the part 22 of the holder, and that opening is intermediate the ends of that small portion. A generally U-shaped contact 46 is mounted in the axially-directed bore 28 at a point above the level of the opening 44, as that opening is viewed in Fig. 6. The U-shaped contact 46 will be adjacent and can rest upon a shoulder between two of the cylindrical portions of different diameter which form the axially-directed bore 28. The contact 46 is similar in configuration and in purpose and function to the contact 50 disclosed in my co-pending application Serial Number 43,035 which was filed August 7, 1948, for Holders For Cartridge Enclosed Projectors For Electric Circuits and which was granted February 2, 1954, as Letters Patent No. 2,668,215. A portion 48 of the contact 46 extends axially of the bore 28 until it reaches the opening 44 and then it turns radially outwardly and passes through the opening 44. Thereafter, the portion 48 again turns and is again directed axially of the bore 28. However, at this time the axially directed portion is at the exterior of the small diameter portion 24 and it coacts with the other axially directed portion to form a generally U-shaped reentrant end for the portion 48. The portion 48 serves as a lead for the U-shaped contact 46, and it may be considered as such. If desired, a separate lead could be used in place of the portion 48. A plate 50 is provided adjacent the opening 44 in the small diameter portion 24, and that plate extends axially of the small diameter portion 24 while also extending circumferentially of that small diameter portion. This plate is arcuate and its arcuate configuration gives it strength, while enabling it to closely abut the portions of the small diameter portion 24 which define the opening 44. An opening is provided in the plate 50, and the portion 48 of the contact 46 extends through that opening. A mass of solder 52 is flown onto the portion 48 of the contact 46 and onto the plate 50 to intimately bond them together and to close the opening in the plate 50. The reentrant configuration of the end of the portion 48 is provided by bending that end of the portion 48 into intimate engagement with the plate 50. In this way, the plate 50 is positively held tightly against the portions of the small diameter portion 24 of the part 22 of the holder which define the opening 44. This tight engagement between the plate 50 and those portions of the small diameter portion 24 will cooperate with the mass of solder 52 to make the side wall of the small diameter portion 24 substantially air-tight and water-tight. An opening 54 is provided in the end of the plate 50.

An axially-directed slot 56 is formed in the part 22 of the holder provided by the present invention, and that slot is long but of small cross section. An elongated conductor 58 of resilient material, such as Phosphor bronze, is mounted in the slot 56. The conductor 58 is substantially as large as the slot 56 and thus it fills that slot and limits the ingress or egress of air or water. One end of the conductor 58 is bent, as at 60, and the bent portion extends inwardly of the next-to-largest cylindrical portion of the bore 28. This bent portion 60 of the conductor 58 can be flattened under pressure, but it will restore itself to the configuration shown in Fig. 6 when that pressure is released.

The groove 62 in the exterior of the small diameter portion 24 of the part 22 extends axially of that small diameter portion. This groove is semi-circular in cross section and it accommodates a resistor 64. This resistor is connected to the tab 42 on the plate 36 and to one end of the conductor 58 by solder 66. The resistor 64 will serve as a voltage-dropping resistor for the holder, for protectors for electric circuits, provided by the present invention. The groove 62 will shield and shelter the resistor 64 and will hold it against sideways movement. In this way, the groove 62 not only protects the resistor 64 from much of the damage or injury to which it could be subjected by nearby objects, but it avoids a shifting of the resistor 64 which could impair the efficacy of the solder 66.

Figure 1:
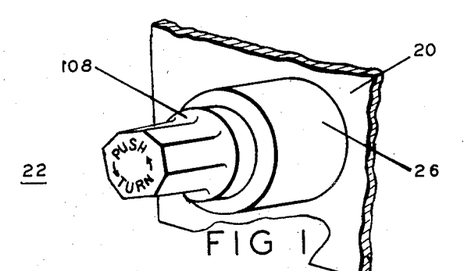
Fig. 1 is a perspective view of a part of a wall, housing, casing or panel on which the holder, for protectors for electric circuits, provided by the present invention is mounted.
Figure 2:
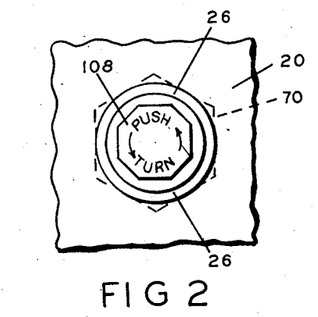
Fig. 2 is a front elevational view of the portion of the wall, housing, casing or panel of Fig. 1 and the holder mounted thereon.
Figure 3:
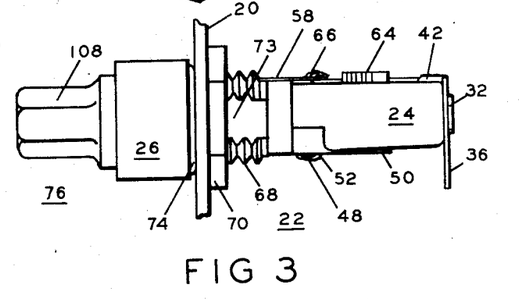
Fig. 3 is a side elevational view of the portion of wall, housing, casing or panel of Figs. 1 and 2 and the holder supported thereon.
Figures 4, 5:
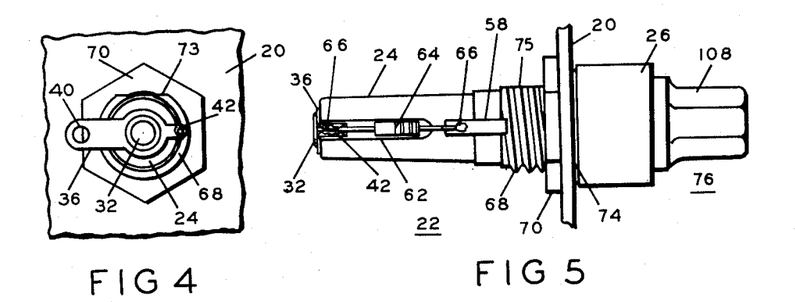
Fig. 4 is a rear elevational view of the portion of the wall, housing, casing or panel of Figs. 1–3 and of the holder supported thereon.
Fig. 5 is a plan view of the portion of the wall, housing, casing or panel of Figs. 1–4 and of the holder supported thereon, and it shows that holder rotated one hundred and eighty degrees.
Figures 6, 7, 8:
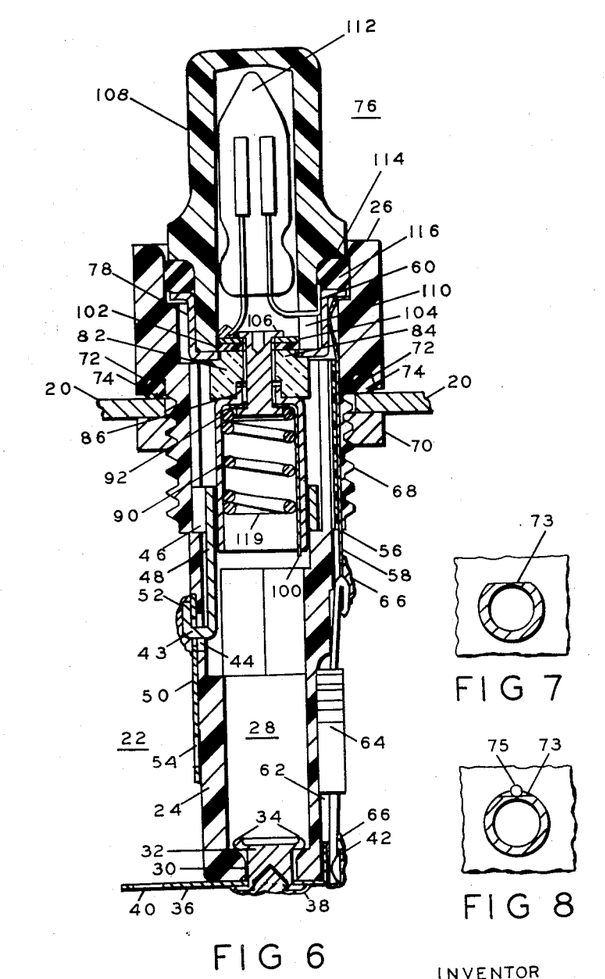
Fig. 6 is an enlarged sectional view of the portion of the wall, housing, casing or panel of Figs. 1–5 and of the holder supported thereon and it is taken along the longitudinal center of that holder.
Fig. 7 is a front elevational view, partly in section, of another portion of a wall, casing, housing or panel in which a holder is mounted.
Fig. 8 is a front elevational view, partially in section, of still another portion of a wall, housing, casing or panel in which a holder is mounted.
Figure 9:
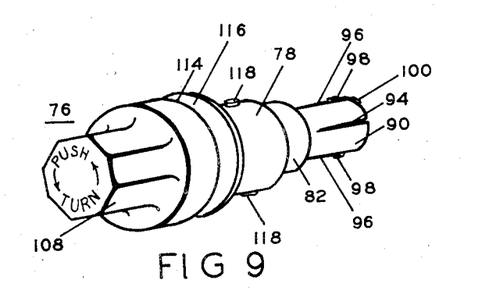
Fig. 9 is an enlarged side elevational view of the closure for the holder, for protectors for electric circuits, provided by the present invention.
Figure 10:
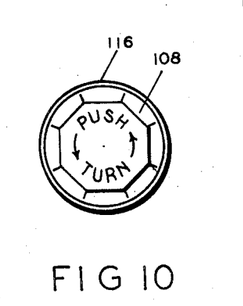
Fig. 10 is an end view of the closure of Fig. 9.
Figure 11:
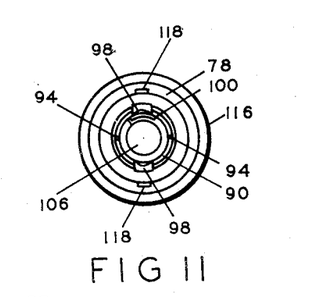
Fig. 11 is a view of the opposite end of the closure of Figs. 9 and 10.
Figure 12:
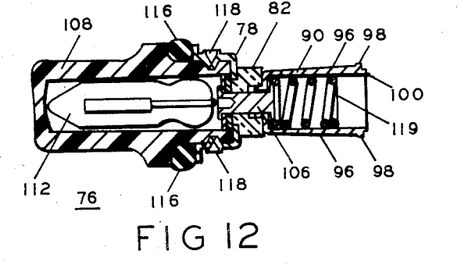
Fig. 12 is a sectional view along the longitudinal axis, of the closure of Figs. 9-11.
Figure 13:
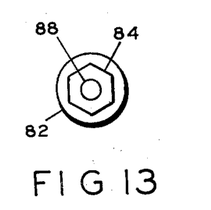
Fig. 13 is a front elevational view of one face of a washer of insulating material used in the closure of Figs. 9-12.
Figures 14, 15:
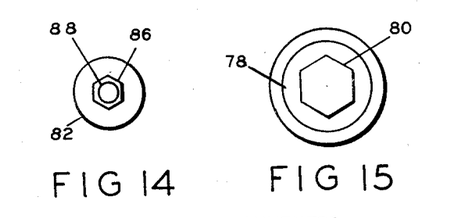
Fig. 14 is a view of the opposite face of the washer of Fig. 13.
Fig. 15 is an end view of a cup-shaped sleeve used in the closure of Figs. 9-12.

Screw threads 68 are provided on the exterior of the small diameter portion 24 of the part 22 of the holder provided by the present invention. These threads will receive and hold a nut 70, and that nut can be tightened on the threads 68 to clamp the holder against a wall, casing, housing or panel, as shown in Figs. 1-6. A flat part 73 is provided in the threaded area of the small diameter portion 24 of the part 22, and that flat part can resist rotation of the part 22 of the holder relative to a wall, housing, casing or panel. For example, if the part 22 is inserted in an opening which is generally circular but which has a straight side, the flat part 73 will abut the straight side of that opening and resist rotation of the part 22 relative to that opening. Such an arrangement is shown in Fig. 7. Openings of this type are known as D-shaped openings and they will be formed by punching or stamping operations. The flat part 73 is also useful in connection with openings that are drilled, where those openings are provided with a notch or recess contiguous to them. A pin 75 can be set in such a notch and will bear against the flat part 73 and thus resist rotation of the part 22 of the holder provided by the present invention.

An annular groove 72 of semi-circular cross section is provided in the shoulder of the part 22 between the small diameter portion 24 and the larger diameter portion 26 of that part. This groove receives an O-ring 74 and it will hold that O-ring in register with the portions of a wall, housing, casing or panel which defines an opening to receive the small diameter portion 24 of the part 22 of the holder. The O-ring 74 will provide a tight seal between the part 22 of the holder and the wall, housing, casing or panel and will prevent the passage of air or water. That O-ring will also yield sufficiently to absorb vibrations which are imparted to the wall, casing, housing or panel and which might otherwise cause the nut 70 to loosen on the threads 68. In mounting the part 22 of the holder, the nut 70 is rotated out of engagement with the threads 68 and is telescoped out of engagement with the small diameter portion 24 of the part 22. Thereafter, the small diameter portion 24 is telescoped through the opening in the wall, housing, casing or panel until the O-ring 74 abuts the portion of the wall, housing, casing or panel which defines the opening, and thereafter the nut is telescoped over the small diameter portion 24 and threaded tightly onto the screw threads 68.

The other part of the holder provided by the present invention is denoted by the numeral 76 and it serves as a closure for the axially-directed bore 28 in the part 22. That closure includes a flanged cup or sleeve 78 which is preferably made of brass. An acircular opening 80 is provided in the center of the bottom of the flanged cup 78. The bottom of the cup 78 receives one face of a washer 82 of insulating material, and a projecting acircular surface 84 on that one face of the washer 82 extend into and mates with the acircular opening 80 in the cup 78. The engagement of the acircular opening 80 with the acircular surface 84 prevents rotation of the washer 82 relative to the cup 78. A recessed acircular surface 86 is provided at the opposite end of the washer 82 and that recessed surface is contiguous to the opening 88 which extends through the geometric center of the washer 82. A tubular contact 90 is part of the closure 76, and that contact has an acircular surface 92 at one end thereof. The acircular surface 92 projects into the acircular recess 86 of the washer 82 and prevents relative rotation between the washer 82 and the tubular contact 96. The acircular surfaces on the washer 82, the acircular surface on the tubular contact 90 and the acircular opening in the cup 78 are all hexagonal in configuration, but if desired, other acircular configurations could be used. The vital purpose of the acircular surfaces is to prevent relative rotation between the cup 78 and the tubular contact 90.

The tubular contact 90 has axially-extending slits 94 at two points on its circumferene. The slits 94 are intermediate axially-extending projections 96 on the exterior of the tubular contact 90. These projections are narrow and are of constant width, and they have radially-extending ears 98 at the ends thereof. The slits 94 in the tubular contact 90 provide a certain amount of expandability for the contact 90, the projections 96 can fit into the notch and gap of the U-shaped contact 46 and can thereafter, upon rotation of the closure 76 relative to the part 22 of the holder, to engage the arm of that contact and force them to move somewhat further apart. The arms of the contact 46 will tend to restore themselves and will thus apply a sizable pressure to the axially-extending projection 96. The ears 98 will keep the closure 76 from pulling out of engagement with the U-shaped contact 46, but those ears will permit separation of the closure 76 from the part 22 of the holder provided by the present invention whenever the closure 76 is rotated to place the ears 98 in register with the notch and gap in the contact 46.

A plate 100 of springy metal has one end thereof bent at right angles to the major portion thereof, and that bent end has an opening through it. The width of the plate 100 is less than the internal diameter of the tubular contact 90, and thus it can fit within that contact. The plate 100 will normally appear to be a chord of the inner diameter of the tubular contact 90, but that plate can be bent by the terminal of a cartridge enclosed protector for electric circuits. When bent, the plate 100 will assume an arcuate configuration and will thus permit the terminal of the protector to telescope into the tubular contact 90. However, that plate will tend to restore itself and will thus apply strong holding forces to that terminal of the protector. The bent end of the plate 100 will bear against the closed end of the tubular contact 90 and the opening in that plate will be in register with the opening in that closed end. A washer 102 of insulating material will be placed in engagement with the projecting acircular surface 84 of the washer 82. The opening in the insulating washer 102 will be in register with the opening in the washer 82. A metal washer will be placed in engagement with the insulating washer 102 and the opening in that metal washer will be in register with the opening in the washers 102 and 82. A rivet will be telescoped through the aligned openings of the plate 100, the closed end of the tubular contact 90, the washer 82, the washer 102 and the washer 104. Thereafter, the upper end of the rivet 106, as that rivet is viewed in Fig. 6, will be riveted over to permanently secure the plate 100, the tubular contact 90, the washer 82, the washer 102 and the washer 104 together. In addition, the rivet 106 will provide a low-resistance electrical path between the tubular contact 90 and the metal washer 104.

A hollow light-transmissive housing 108 is provided for the closure 76. This housing is made of polystyrene which is a thermoplastic material. That housing has an elongated bore therein and it has a radially-directed shoulder 114 thereon intermediate the ends thereof. The portion of the exterior of the housing 108 below the shoulder 114, as that housing is viewed in Fig. 6, is cylindrical in configuration and has an outside diameter closely approximating the inside diameter of the flanged cup 78. Hence the cylindrical lower portion of the housing 108 can telescope within the cup-shaped sleeve 78. The housing 108 has a notch 110 in the end thereof and that notch can receive one lead from a lamp 112 disposed within the housing 108. That lead will bend upwardly from the notch, as the housing 108 is viewed in Fig. 6, and will be wedged between the cylindrical exterior of the bottom portion of the housing 108 and the inner surface of the flanged cup 78. This wedging action will provide a good physical and electrical connection between that lead and the flanged cup 78. The other lead of the lamp 112 is soldered to the metal washer 104. In actual practice the lead of the lamp 112 will be soldered to the washer 104 before that washer is assembled with the rivets 106, the washer 102, the washer 82, the plate 100 and the tubular contact 90. This facilitates the assembly of the closure 76.

The shoulder 114 on the housing 108 and the flange on the flanged cup 78 define an annular recess on the closure 76. This recess can receive and confine an O-ring 116. The outer diameter of the O-ring 116 will be greater than the inner diameter of the largest-diameter cylindrical section of the bore 28 of the part 22 of the holder. Consequently, that O-ring will have to be squeezed and compressed whenever it is telescoped within the large diameter portion 26 of the part 22 of the holder. The squeezing and compressing of the O-ring 116 will enable that ring to provide a water-tight and air-tight seal between the closure 76 and the part 22 of the holder.

The numeral 118 denotes two diametrically spaced projections on the cup-shaped sleeve 78 of the closure 76. These projections are formed by placing a rapidly rotating hardened steel point in engagement with the exterior of that sleeve and pressing inwardly on that point. The rapid rotation and the pressure will coact to heat the cup-shaped sleeve 78 and to heat the polystyrene of the housing 108 in engagement with that sleeve. As the rotation and pressure is continued, the wall of the flanged cup 78 will deform and be forced into the locally heated and thus softened portion of the housing 108. Once the projections 118 have been formed, the housing 108 and the flanged cup 78 are permitted to cool. This will enable the polystyrene of the housing 108 to harden and positively prevent separation of the flanged cup 78 from the housing 108. Moreover, the projections 118 will coact with the now-hardened material of the housing 108 to positively prevent relative rotation between the housing 108 and the flanged cup 78. In this way, the housing 108 can be used to cause rotation of the tubular contact 90; that contact being locked against rotation relative to the flanged cup 78, and the flanged cup 78 being locked against rotation relative to the housing 108.

A helical spring 119 is disposed within the tubular contact 90 and it will bear against the walls of that contact and against the plate 100. The engagement between the helical spring 119 and the plate 100 will keep the spring 119 from falling out of the tubular contact 90. The helical spring 119 is shorter than the tubular contact 90, and thus it permits the end of a cartridge enclosed protector for electric circuits to be inserted in the open end of the tubular contact 90. The flat plate 100 will be distorted by that one end, or terminal, of the protector for electric circuits and the resilient force applied to that terminal by the plate 100 will keep that terminal from slipping out of the tubular contact 90. Thus the closure 76 can carry the protector for electric circuits with it. However, a moderate pull applied to the protector for electric circuits will overcome the frictional forces exerted by the plate 100 and will thus permit separation of the protector for electric circuits from the closure 76.

When a cartridge enclosed protector for electric circuits is to be used with the holder of Fig. 6, the closure 76 is rotated until the ears 98 and the projections 96 on the tubular contact 90 are in register with the notch and gap in the U-shaped contact 46. Thereupon, the closure 76 can be separated from the part 22 of the holder. Once the closure 76 has been separated from the part 22 of the holder, it is a simple matter to telescope one terminal of a cartridge enclosed protector within the open end of the tubular contact 90. Thereafter, the closure 76 will be placed in register with the open end of the axially extending bore in the part 22 of the holder with the other end of the cartridge enclosed protector for electric circuits immediately adjacent the large diameter portion 26 of the part 22. The closure 76 will be rotated so the ears 98 and the projections 96 on the tubular contact 90 are again in register with the notch and gap of the U-shaped contact 46 and thereupon the closure 76 is moved toward the part 22 of the holder until the ears 98 are below the bottom of the U-shaped contact 46, as that contact is viewed in Fig. 6. Thereupon, the closure 76 is rotated to place those ears out of register with the notch and gap of the U-shaped contact 46. During the movement of the closure 76 to the position indicated, the other end of the protector for electric circuits had engaged the rim 34 on the contact 32 and had forced the helical spring 119 to become compressed. Once the closure 76 has been rotated to the desired position, the closure 76 can be released and thereupon the spring 119 will act against the upper end of the protector for electric circuits and will force the closure 76 away from the contact 32 until the ears 98 on the tubular contact 90 intimately engage the lower edge of the U-shaped contact 46. The ears 98 will resist further separating movement of the closure 76 and will assure good electrical contact between the tubular contact 90 and the U-shaped contact 46.

If current is applied to the plate 50, current will flow into the U-shaped contact 46 and thence to the tubular contact 90. Most of the current will then flow through the protector for electric circuits to the contact 32 and thence to the plate 36, to which a lead can be connected. The rest of the current will flow through the rivet 106 to the washer 104 and thence through the lamp 112 to the flanged cup 78, through the elongated springy contact 58 to the resistor 64 and thence to the plate 36. The protector for electric circuits is thus effectively in parallel relation with the lamp 112, but the combined resistance of the lamp 112 and the resistor 64 will be so great that very little current will pass through the lamp 112. The amount of current that will pass through the lamp 112 will not be sufficient to illuminate that lamp as long as the protector for electric circuits is intact. When the protector for electric circuits "blows" the entire voltage across the plates 50 and 36 will be applied to the series-connected lamp 112 and resistor 64. The resistor 64 will be selected so its resistance is sufficient to drop the voltage across the lamp 112 to levels which that lamp can withstand indefinitely. A certain amount of electrical energy will be dissipated in the lamp 112 and in the resistor 64, and this energy will be dissipated to a considerable extent in the form of heat. However, heat from the resistor 64 cannot adversely affect the thermoplastic material of the housing 108 because the resistor 64 will be on one side of the wall, casing, housing, or panel 20 while the housing 108 is on the other side of that panel. Heat from the lamp 112 will act upon the thermoplastic material of the housing 108, but the lamp 112 can be selected so the heat from that lamp will not be sufficient to distort or soften the housing 108.

The holder provided by the present invention will thus remain unilluminated as long as a protector for electric circuits is disposed within the holder and is intact. If the protector for electric circuits is removed, or if it "blows" the lamp 112 will become illuminated. In this way, the holder provided by the present invention gives visual indications of the presence and condition of a protector for electric circuits.

It should be noted that the path for the current flowing to the lamp 112 is independent of the configuration or the cleanliness of the terminals of the protector for electric circuits within the holder. Specifically, the current flows from the U-shaped contact 46 directly to the tubular contact 90 and thence through the rivet 106, washer 104, lamp 112, flanged cup 78, springy conductor 58, resistor 64 and tab 42 to the plate 36. Such an arrangement provides a higher degree of reliability than was possible in prior illuminated holders for protectors for electric circuits.

If desired, the lamp can be connected in series rather than in parallel with the protector for electric circuits. Where such an arrangement is desired, it is not necessary to rebuild the holder provided by the present invention;

instead, it is only necessary to make minor changes in the construction of that holder. This versatility is important, and it is illustrated by the circuit and holder of Figs. 16 and 17 respectively. The plate 36 of the holder is modified by having the securing tab 42 cut off. One lead of the resistor 64 is left long instead of being cut short enough to just lap the securing tab 42 of the plate 36, and that lead can be suitably secured according to the circuit of Fig. 16. All other parts of the holder provided by the present invention will be as indicated in Fig. 6.

Figures 16, 17:
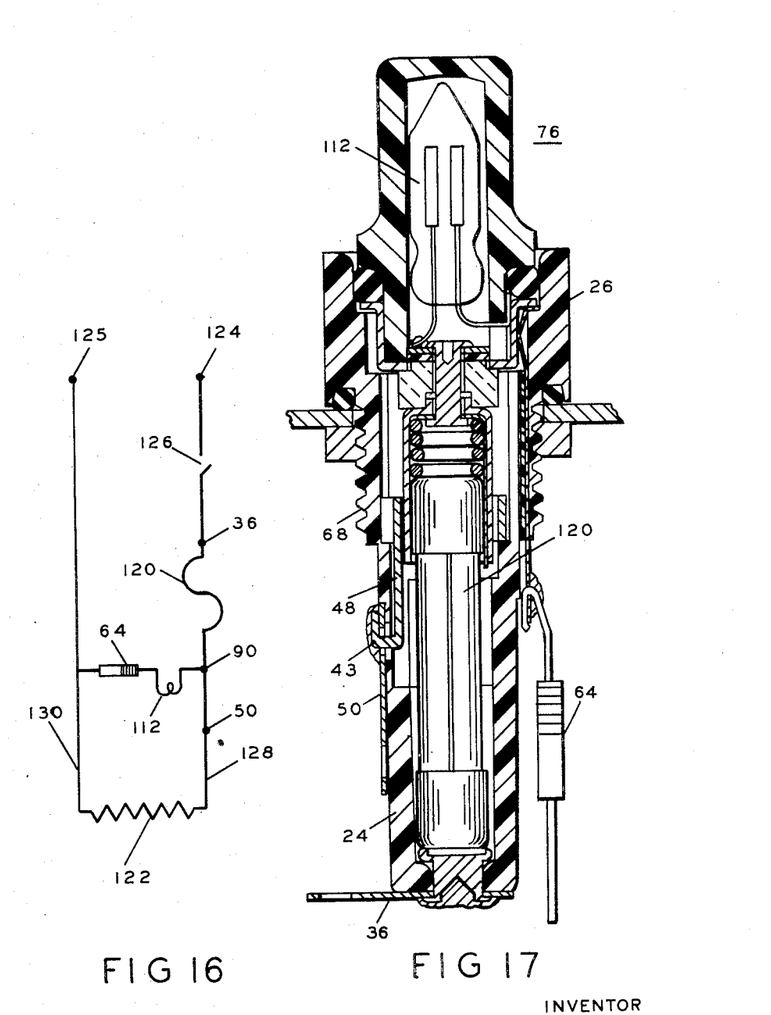
Fig. 16 is a schematic diagram of a circuit in which a modified form of the holder, for protectors for electric circuits, provided by the present invention can be used.
Fig. 17 is a sectional view of the modified holder shown in Fig. 16.

The protector for electric circuits of Figs. 16 and 17 is denoted by the numeral 120, and that protector is intended to protect a load 122. The numeral 124 and the numeral 125 respectively denote the terminals of the circuit of Fig. 16, and those terminals can be suitably secured to a source of electric current. A switch 126 is disposed between the terminal 124 and the plate 36 of the holder shown in Fig. 17. Current will flow from the plate 36 into the terminal 32 and thence through the protector 120 to the tubular contact 90. At this time, the current will divide, part of it flowing through the U-shaped contact 46 to the plate 50 and then through the conductor 128 to the load 122 and then by means of a conductor 130 to the terminal 125. The rest of the current will flow through the rivet 106 to the washer 104 and then through the lamp 112 to the flanged cup 78 and then through the springy conductor 58 and the resistor 64 to a point intermediate the ends of the conductor 130. The load 122 will be in parallel with the series-connected lamp 112 and resistor 64, and the protector for electric circuits 120 will be intermediate the parallel connected group of elements and the terminals 124 and 125. As a result, current will pass through the lamp 112 whenever the protector 120 is in the holder and is intact. When the protector 120 is removed or "blows" to protect the load 122, the lamp 112 will go out. The value of the resistor 64 will be such that the lamp 112 is protected against excessive voltage but will have sufficient current flowing through it to keep it illuminated when the protector 120 is intact.

Figure 18:
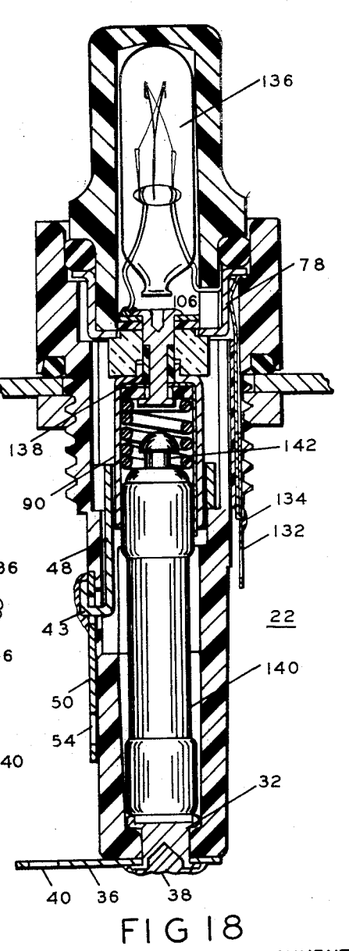
Fig. 18 is a sectional view of another modified form of holder, for protectors for electric circuits, provided by the present invention.
Figure 19:
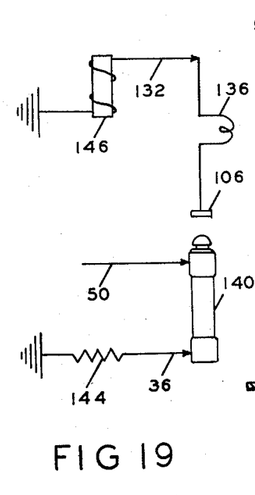
Fig. 19 is a schematic diagram of a circuit in which the holder of Fig. 18 can be used.

The holder provided by the present invention can also be used in audible alarm circuits. For example, Figs. 18 and 19 disclose a modified holder that is made in accordance with the principles and teachings of the present invention and a circuit embodying that holder. The holder of Fig. 18 has a fixed part 22 which is identical with the part 22 of the holder of Fig. 6 except for the fact that the securing tab 42 on the plate 36 has been cut off and a plate 132 has been secured to the flexible conductor 58 by solder 134. The resistor 64 has been removed. The closure of the holder of Fig. 18 is very similar to the closure 76 of Fig. 6 but it has an incandescent lamp 136 instead of the neon lamp 112 of the closure 76 of Fig. 6. In addition, a flanged sleeve 138 of insulating material is interposed between the rivet 106 and the closed end of the tubular contact 90. This flanged sleeve of insulating material electrically isolates the tubular contact 90 from the flanged cup 78 of the holder of Fig. 18. A protector for electric circuits 140 is provided with a "live" indicator 142 which is normally held in retracted position by the active current-carrying elements of that protector. When the protector 140 "blows" the indicator 142 will extend outwardly beyond the position shown in Fig. 18 and will engage the rivet 106. The indicator 142 will then complete a circuit from the plate 50 through the U-shaped contact 46, through the tubular contact 90, through the left hand terminal of the protector 140, through the indicator 142, through the rivet 106, through the metal washer 104, through the lamp 136, through the flanged cup 78, and then through the springy conductor 58 to the plate 132. When the protector 140 "blows," the circuit from the plate 36 through the contact 32 and through the protector 140 to the tubular contact 90 and then through the U-shaped contact 46 to the plate 50 will be broken. A load 144 can be connected to the plate 136 and to one side of the line. The other side of the line can be connected to the plate 50. For clarity and simplicity of illustration, the circuit in Fig. 19 is made a grounded circuit and the load 144 is connected between ground and the "hot" line which is connected to the plate 50 of the holder provided by the present invention. A solenoid 146 for an alarm is connected to ground and has its other end connected to the plate 132 of the protector in Fig. 18. Ordinarily the air gap between the indicator 142 and the rivet 106 will keep the alarm solenoid 146 de-energized. However, when the protector for electric circuits 140 "blows" the circuit through the alarm solenoid 146 will be completed and that alarm will be suitably energized. The impedance of the alarm solenoid 146 will be selected so the voltage applied to the lamp 136 will be within limits that such lamp can accommodate. With this arrangement, the "blowing" of the protector for electric circuits 140 will set off the alarm and will keep that alarm operating until the closure is removed and a new protector 140 inserted in the holder.

Whereas several preferred embodiments of the present invention have been shown and described in the drawing and accompanying description it should be apparent to those skilled in the art that various changes may be made in the form of the invention without affecting the scope thereof.

What I claim is:

1. In a holder for protectors for electric circuits that comprises an electrically non-conducting body, a bore within said body, an electrically conducting terminal at one end of said bore, a second electrically conducting terminal that is in said body and is contiguous with said bore, and a closure that has a protector-engaging electrically conducting contact thereon and that is selectively engageable with said body to hold a protector for electrical circuits in electrical connection with said terminals, the improvement which comprises making such closure-carried contact tubular, a plate of resilient metal that is disposable within said tubular closure-carried contact and has a generally flat portion that is disposed as a chord of the arc defined by said tubular closure-carried contact, said generally flat portion of said plate being distortable by a protector for electric circuits insertable in said tubular closure-carried contact but responding to its restorative forces to hold said protector against accidental separation from said tubular closure-carried contact.

2. In a holder for protectors for electric circuits that comprises an electrically non-conducting body, a bore within said body, an electrically conducting terminal at one end of said bore, a second electrically conducting terminal that is in said body and is contiguous with said bore, and a closure that has a protector-engaging electrically conducting contact thereon and that is selectively engageable with said body to hold a protector for electrical circuits in electrical connection with said terminals, the improvement which comprises making said closure-carried contact tubular, a plate of resilient metal within said tubular closure-carried contact which has a generally flat portion that is a chord of the arc defined by said tubular closure-carried contact, said generally flat portion of said plate being distortable by a protector for electric circuits insertable in said tubular closure-carried contact but responding to its restorative forces to hold said protector against accidental separation from said tubular closure-carried contact, said plate being permanently secured in said tubular closure-carried contact and having the outer end thereof adjacent the outer end of said tubular closure-carried contact.

3. A holder for protectors for electric circuits that comprises an electrically non-conducting body, a bore in said body, a carrier for a protector for electric circuits that is selectively movable into engagement with said body to place said protector within said bore, a light-transmitting housing on said carrier, a lamp in said housing, and an electrical resistor that is connected in series relation with said lamp whenever said carrier is in engagement with said body, said resistor being mounted on the exterior of said body and being spaced from said light-transmitting housing and from the air within said bore, the portion of said body intermediate said resistor and said bore constituting an insulating barrier between said air within said bore and said resistor.

4. A holder for protectors for electric circuits that comprises an electrically non-conducting body, a bore in said body, a carrier for a protector for electric circuits that is selectively movable into engagement with said body to place said protector within said bore, a light-transmitting housing on said carrier, a lamp in said housing, a smooth-walled cylindrical metal sleeve that receives one end of said light-transmitting housing, and a projection on the inner wall of said smooth-walled cylindrical sleeve that extends into a complementary recess in said light-transmitting housing and maintains said sleeve and light-transmitting housing in assembled relation.

5. A holder for protectors for electric circuits that comprises an electrically non-conducting body, a bore in said body, a carrier for a protector for electric circuits that is selectively movable into engagement with said body to place said protector within said bore, a light-transmitting housing on said carrier, a lamp in said housing, a recess in the exterior of said body, and an electrical resistor that is connected in series relation with said lamp whenever said carrier is in engagement with said body, said resistor being positioned in and protected by said recess in the exterior of said body, said recess and said resistor being spaced from said light-transmitting housing and from said protector for electric circuits, the portion of said body intermediate said bore and said recess constituting an insulating barrier to the flow of heat from said resistor to said bore, said resistor being free to radiate its heat to the surrounding atmosphere.

6. In a holder, for protectors for electirc circuits, that has an electrically non-conducting body, a bore in said body to receive a protector for electric circuits, and a closure for said body the improvement which comprises a light-transmitting housing of thermoplastic material, a lamp in said housing, and an electrical resistor that is mounted on and permanently secured to the exterior of said body and is located exteriorly of said bore and is spaced from said housing, whereby temperature rises in said housing and in said bore of said body are substantially independent of heat generated by said resistor.

7. In a holder, for protectors for electric circuits, that has an electrically non-conducting body, a bore in said body, an electrically conducting contact contiguous with said bore, a second electrically conducting contact contiguous with said bore, and a closure for said bore, the improvement which comprises a springy, electrically conducting contact on said body, an electrically conducting lead extending between said springy contact and the first said contact, an electrically conducting contact that is carried by said closure and is selectively engageable with said springy contact, said springy contact normally being in the path of said closure-carried contact and being engaged and moved out of said path by said closure-carried contact whenever said closure is moved into position to close said bore a second electrically conducting contact that is carried by said closure and is selectively engageable with said second contact, and a lamp that is connected to the first said closure-carried contact and to said second closure-carried contact, said lead and said springy contact and the first said closure-carried contact and said lamp shunting a protector for electric circuits that engages said second closure-carried contact and the first said contact and responding to opening of said protector to energize said lamp.

8. In a holder, for protectors for electric circuits, that has an electrically non-conducting body, a bore in said body, an electrically conducting contact contiguous with said bore, a second electrically conducting contact contiguous with said bore, and a closure for said bore, the improvement which comprises a springy, electrically conducting contact on said body, an electrically conducting lead extending between said springy contact and the first said contact, an electrically conducting contact that is carried by said closure and is selectively engageable with said springy contact, said springy contact normally being in the path of said closure-carried contact and being engaged and moved out of said path by said closure-carried contact whenever said closure is moved into position to close said bore a second electrically conducting contact that is carried by said closure and is selectively engageable with said second contact, and a lamp that is connected to the first said closure-carried contact and to said second closure-carried contact, said second closure-carried contact and the first said contact normally engaging a protector for electric circuits, said springy contact and the first said closure-carried contact and said second closure-carried contact and said second contact providing an energizing path for said lamp that is independent of the engagement between said protector and the first said and said second contacts.

9. In a holder for protectors for electric circuits that comprises an electrically non-conducting body, a bore within said body, an electrically conducting terminal at one end of said bore, a second electrically conducting terminal that is in said body and is contiguous with said bore, and a closure that has a protector-engaging electrically conducting contact thereon and that is selectively engageable with said body to hold a protector for electrical circuits in electrical connection with said terminals, the improvement which comprises an acircular surface on one end of said closure-carried contact, a washer of insulating material that has an acircular surface at one end thereof that is complementary to and engages said acircular surface on said closure-carried contact, an acircular surface at the opposite end of said washer, an annular metal contact that has an acircular surface thereon that is complementary to the acircular surface on said opposite face of said washer, a second washer of insulating material adjacent said metal contact, a metal washer, a lamp that has its terminals connected to said metal washer and to said metal contact and a metal rivet that extends through said one end of said closure-carried contact, through said washers and through said metal contact and electrically connects said closure-carried contact and said metal washer, said acircular surfaces preventing relative rotation of said closure-carried contact and said metal contact.

10. A holder, for protectors for electric circuits, that can be used with protected electrical equipment and that comprises an electrically non-conducting body, a bore in said body, a closure for said body that can extend a predetermined distance into said bore in said body, an annular groove in the exterior of said closure, said body having a smooth cylindrical surface that is in register with said annular groove in the exterior of said closure whenever said closure extends into said bore said predetermined distance, and an O-ring of resilient material disposed in said groove, said smooth cylindrical surface of said body coacting with the groove-defining portions of said closure to confine and enclose all sides of said O-ring, said O-ring coacting with said smooth cylindrical surface of said body and with said groove-defining portions of said closure to provide positive seals.

11. A holder for protectors for electric circuits that comprises an electrically non-conducting body, a bore in said body, a carrier for a protector for electric circuits that is selectively movable into engagement with said body to place said protector within said bore, a light-transmitting housing on said carrier, a lamp in said housing, and an electrical resistor that is connected in series relation with said lamp whenever said carrier is in engagement with said body, said resistor being mounted on the exterior of said body and being spaced from said light-transmitting housing and from the air within said bore, said resistor being disposable on one side of a panel or wall while said light-transmitting housing is disposable on the opposite side of said panel or wall.

12. In a holder, for protectors for electric circuits, that has an electrically non-conducting body, a bore in said body to receive a protector for electric circuits, and a closure for said body the improvement which comprises a light-transmitting housing of thermoplastic material, a lamp in said housing, and an electrical resistor that is mounted on and permanently secured to the exterior of said body and is located exteriorly of said bore and is spaced from said housing, whereby temperature rises in said housing and in said protector for electric cricuits are substantially independent of heat generated by said resistor, said resistor being disposable on one side of a panel or wall while said light-transmitting housing is disposable on the opposite side of said panel or wall.

13. In a holder, for protectors for electric circuits, that has an electrically non-conducting body, a bore in said body, an electrically conducting contact contiguous with said bore, a second electrically conducting contact contiguous with said bore, and a closure for said bore, the improvement which comprises a springy, electrically conducting contact on said body, an electrically conducting lead extending between said springy contact and the first said contact, an electrically conducting contact that is carried by said closure and is selectively engageable with said springy contact, said springy contact normally being in the path of said closure-carried contact and being engaged and moved out of said path by said closure-carried contact whenever said closure is moved into position to close said bore, a second electrically conducting contact that is carried by said closure and is selectively engageable with said second contact, a third electrically conducting contact that is carried by said closure and is disposed within but electrically insulated from said second closure-carried contact, and a lamp that is connected to the first said closure-carried contact and to said third closure-carried contact, said second closure-carried contact holding one terminal of a protector for electric circuits in register with but spaced from said third closure-carried contact whereby whenever said protector for electric circuits "opens" a "live" indicator of said protector for electric circuits will move into engagement with said third closure-carried contact, said lead and said springy contact and the first said closure-carried contact and said lamp and said third closure-carried contact coacting with said "live" indicator to shunt an "opened" protector for electric circuits that engages said second closure-carried contact and the first said contact to energize said lamp.

14. In a holder, for protectors for electric circuits, an electrically non-conducting body, a bore in said body, an electrically conducting contact contiguous with said bore, a second electrically conducting contact contiguous with said bore, and a closure for said bore, the improvement which comprises a springy electrically conducting contact on said body, an electrically conducting lead extending between said springy contact and the first said contact, an electrically conducting contact that is carried by said closure and is selectively engageable with said springy contact, said springy contact normally being in the path of said closure-carried contact and being engaged and moved out of said path by said closure-carried contact whenever said closure is moved into position to close said bore, a second electrically conducting contact that is carried by said closure and is selectively engageable with said second contact, and a lamp that is connected to the first said closure-carried contact and to a third contact that is carried by said closure but is insulated from said second closure-carried contact, said second closure-carried contact and the first said contact normally engaging a protector for electric circuits, said third closure-carried contact normally being out of engagement with said protector for electric circuits but being engageable by a "live" indicator of said protector for electric circuits whenever said protector for electric circuits "opens," said springy contact and the first said closure-carried contact and said second closure-carried contact and said third closure-carried contact and said second contact and said "live" indicator providing an energizing path for said lamp that is independent of the engagement between said protector and the first said contact.

References Cited in the file of this patent

UNITED STATES PATENTS

| | | |
|---|---|---|
| 1,601,926 | Simpson | Oct. 5, 1926 |
| 1,664,228 | Sparkes | Mar. 27, 1928 |
| 1,775,055 | Tarbox et al. | Sept. 2, 1930 |
| 1,844,030 | Burno | Feb. 9, 1932 |
| 2,144,139 | Batcheller | Jan. 17, 1939 |
| 2,187,441 | Zwack | Jan. 16, 1940 |
| 2,207,837 | Sundt | July 16, 1940 |
| 2,255,470 | Matthews | Sept. 9, 1941 |
| 2,258,231 | Alden | Oct. 7, 1941 |
| 2,266,841 | Altschule | Dec. 23, 1941 |
| 2,272,244 | Klein | Feb. 10, 1942 |
| 2,297,336 | White | Sept. 29, 1942 |
| 2,386,060 | Powell | Oct. 2, 1945 |
| 2,448,389 | Powell | Aug. 31, 1948 |
| 2,471,848 | Von Hoorn | May 31, 1949 |
| 2,586,869 | Sculthorpe | Feb. 26, 1952 |
| 2,605,315 | Hargett | July 29, 1952 |
| 2,668,888 | Johnson | Feb. 9, 1954 |
| 2,673,910 | Alden | Mar. 30, 1954 |
| 2,701,871 | Rauch | Feb. 8, 1955 |

FOREIGN PATENTS

| | | |
|---|---|---|
| 572,789 | Great Britain | Oct. 24, 1945 |